Dec. 13, 1927.
C. E. THOMPSON, JR
1,652,690
AUTOMATIC ADJUSTING APPARATUS FOR LAWN MOWERS
Filed Feb. 2 1926
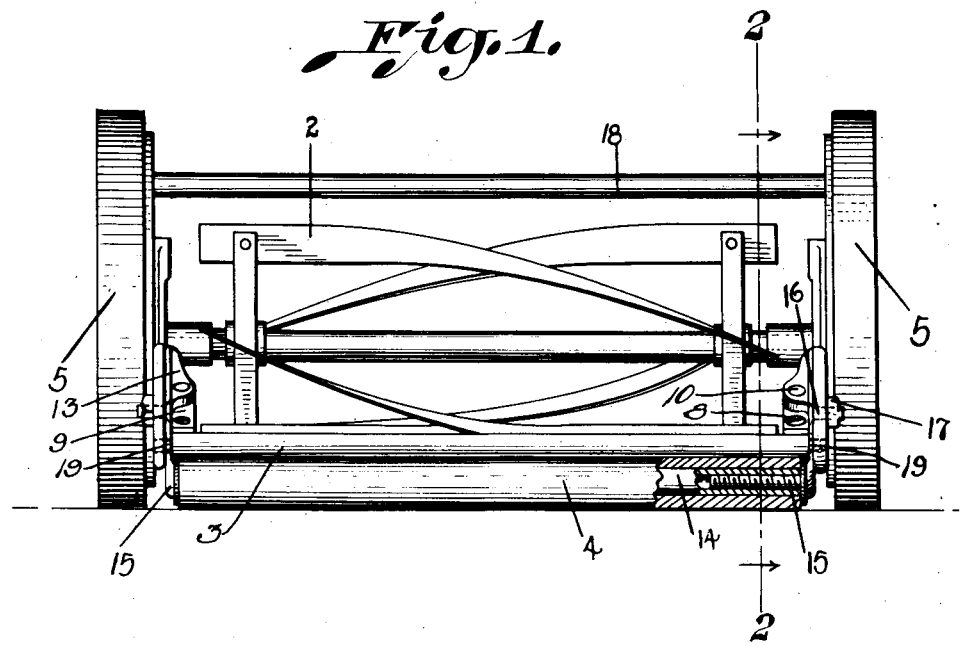
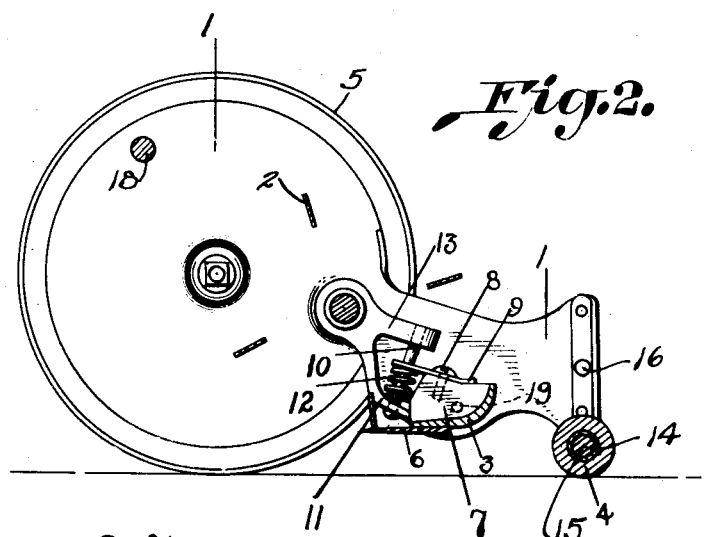
Witnesses
Raymond L. Keplinger.
Calvin P. Howell.
Inventor:
Charles Edward Thompson Jr.

Patented Dec. 13, 1927.

1,652,690

UNITED STATES PATENT OFFICE.

CHARLES EDWARD THOMPSON, JR., OF MARTINSBURG, WEST VIRGINIA.

AUTOMATIC ADJUSTING APPARATUS FOR LAWN MOWERS.

Application filed February 2, 1926. Serial No. 85,452.

My invention relates to improvements in automatic adjusting apparatus for lawn mowers, and one object is to provide uniformly maintained contact between the cutting edge of a blade of the cutting reel, and the cutting edge of the blade on the cutter bar.

The other object is to provide a rod of sufficient diameter below the axis of the reel and parallel to it, which forms an axis about which the wooden roller may revolve. The purpose of said rod is to act primarily as a means of establishing a rigid mower unit throughout, thus enabling the axis of the reel and the axis of the cutter bar to be maintained permanently in absolute parallelism which is essential in order to provide for the proper contact between the cutting edge of a blade of the cutting reel and the cutting edge of the blade on the cutter bar.

I obtain these objects by the mechanism illustrated in the accompanying drawings in which Figure 1 is a rear view of a portion of a lawn mower, of the general type for which my invention is adapted, showing my invention applied thereto, part of the roller being broken away to illustrate the mechanism used and the means whereby the brace rod is detachably connected to the frame members.

Figure 2 is a sectional side elevation view on the line 2—2 of Figure 1, showing the location on the inner side of the frame of my invention.

Similar numerals refer to similar parts more in detail throughout the accompanying description.

The numeral 1 designates the side frame members, 2, the reel, 3, the cutter bar, 4, the roller and 5, the wheels, said frame members, reel, cutter bar, roller and wheels being of a lawn mower of usual construction.

In carrying out my invention, I employ means, whereby the cutter bar blade is automatically held against the blades of the cutting reel. The cutter bar 3 has riveted thereto a knife blade 6, of usual type, said cutter bar being pivotally mounted in the side frames 1, as is common in lawn mowers of ordinary construction and as shown in Figures 1 and 2 at 19. The integrally cast end block 7 of cutter bar 3 has attached to its upper edge by means of screws 8 a thin metal arm or plate 9 having an opening drilled in its forward end of sufficient diameter through which retainer pin 10 is passed.

The retainer pin 10 is also passed through an opening of sufficient diameter in lug 11, which is integral with frame 1, said pin 10 also passes through an opening in lug 13, which is integral with frame 1.

Spring 12, encircling retainer pin 10, exerts a sufficient pressure which it possesses against arm 9, said pressure acting through the integrally cast end block 7, of the pivotally mounted cutter bar 3, around pivot 19, tending to force the forward edge of the blade of the cutter bar 3 against the cutting edge of a blade of reel 2.

A detachably connected brace rod 14 extending to both sides of the mower frame 1 forming the axis about which the ground roller 4 revolves, has openings drilled and threaded within each end to a sufficient depth to admit correspondingly threaded arms of connecting elements 15, said connecting elements being securely attached to side frame members 1 by fastening elements 16, and nuts 17.

The brace rod 14 being in the same plane and coacting with the ordinary tie rod 18, establishes a rigidness that is essential in order to maintain the axis of the cutting reel and the axis of the cutter bar at all times parallel to each other; this is necessary to insure proper contact between the blade of the cutter bar throughout its entire length with the blade of the cutting reel. It is to be understood that any other means which accomplishes this result, that is, maintains the mower frame rigid throughout, may be used; but the specific means shown herein has been found to be satisfactory.

I claim:

In a lawn mower, side frames, each side frame having an integrally cast member thereon comprising spaced lugs, a rotating cutting reel, a cutter bar, means for yieldingly holding the cutter bar against the rotating reel, said means comprising a plate fixed to each end of the cutter bar, and having an opening in the end thereof, a pin fixed to each integrally cast member in said spaced lugs and passing freely through the opening in the plate, and a spring coiled about each pin and acting between said plate and one of said spaced lugs in a direction to constantly yieldingly hold said cutter bar against the rotating cutting reel.

CHARLES EDWARD THOMPSON, Jr.